June 30, 1959    HANS-JOACHIM M. FÖRSTER    2,892,355
SPEED CHANGE TRANSMISSION, PARTICULARLY FOR MOTOR VEHICLES
Filed Dec. 8, 1951                                    2 Sheets-Sheet 1

Inventor
Hans-Joachim M. Förster
By Austin, Dicke, Wilhelm and Padlon
Attorneys

June 30, 1959   HANS-JOACHIM M. FÖRSTER   2,892,355
SPEED CHANGE TRANSMISSION, PARTICULARLY FOR MOTOR VEHICLES
Filed Dec. 8, 1951                             2 Sheets-Sheet 2
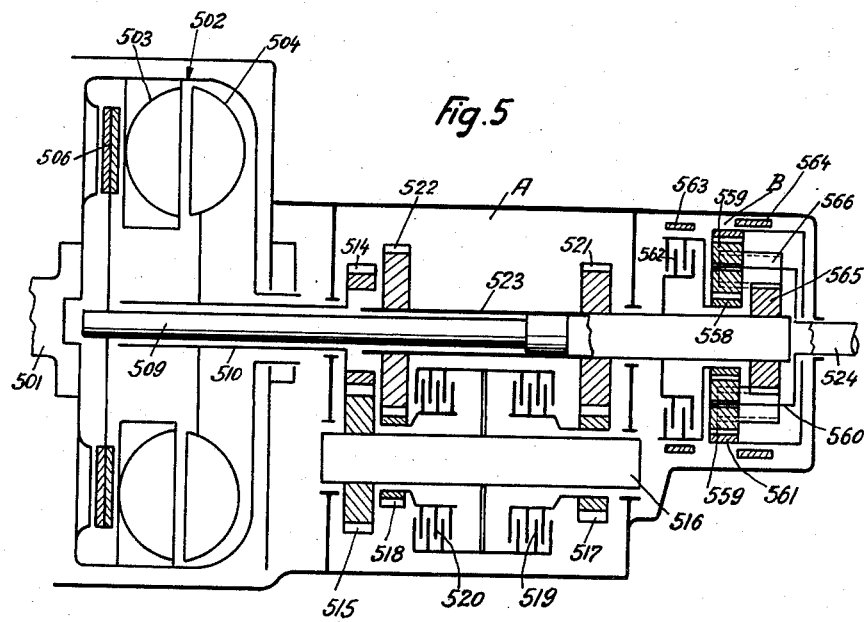
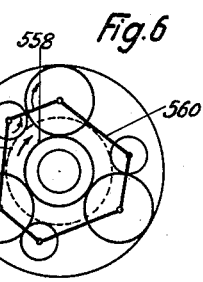
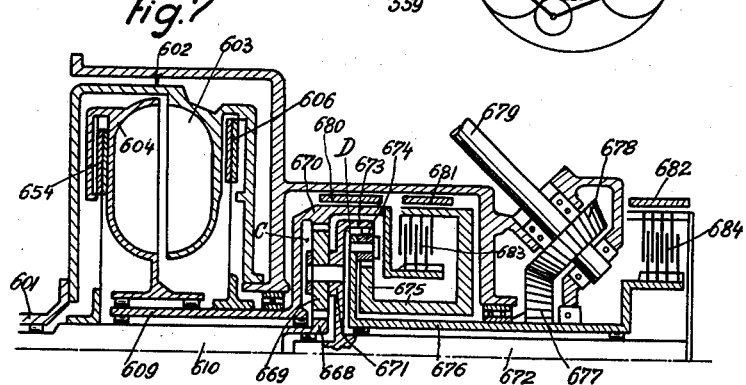
Inventor
Hans-Joachim M. Förster
By Austin, Licke, Wilhelm and Padlon
Attorneys

United States Patent Office 2,892,355
Patented June 30, 1959

2,892,355

SPEED CHANGE TRANSMISSION, PARTICULARLY FOR MOTOR VEHICLES

Hans-Joachim M. Förster, Stuttgart-Bad Cannstatt, Germany, assignor to Daimler-Benz Aktiengesellschaft, Stuttgart-Unterturkheim, Germany Application December 8, 1951, Serial No. 260,668

Claims priority, application Germany December 11, 1950

15 Claims. (Cl. 74—330)

My invention relates to a speed change transmission, particularly for motor vehicles, and more especially to a transmission of the type including a hydrodynamic clutch incapable at very low speeds of transferring any appreciable driving torque and, therefore, of stalling the engine when the driven shaft is arrested, such as by stopping the vehicle.

It is the object of the present invention to provide a transmission of that type which excels by its simplicity and ruggedness and thus lends itself to manufacture at a low cost and yet is reliable in operation.

Further objects of my invention will appear from a detailed description of a number of embodiments shown in the accompanying drawings and the features of novelty will be pointed out in the claims.

In the drawings, which illustrate more or less diagrammatically a number of embodiments of the invention without, however, restricting the invention thereto, Fig. 1 is a transmission including a hydrodynamic clutch and a secondary transmisison shaft, said transmission having four forward speeds;

Fig. 5 illustrates another transmisison for six speeds including a secondary transmission shaft and an epicyclic gearing;

Fig. 6 is a diagrammatic cross section through the epicyclic gearing shown in Fig. 5; and Fig. 7 is a partial axial section through a five-speed transmission including two epicyclic gearings arranged in tandem.

Figure 1:
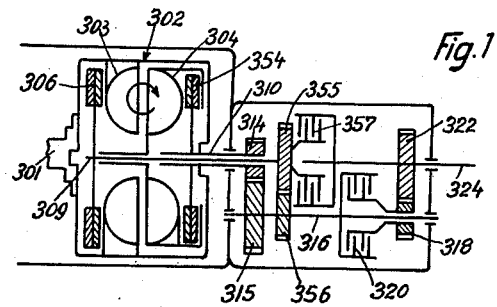

The transmission shown in Fig. 1 comprises a driving shaft 301 that may be the crankshaft of an automobile engine, a driven shaft 324 which may be the shaft driving the rear axle transmission of the motor vehicle, and two motion-transmitting trains of elements, each of which connects the driving shaft 301 with the driven shaft 324 and which will be described hereinafter. The first motion-transmitting train of elements includes a hydrodynamic clutch designated as a whole by 302 and composed of the driving section 303 rigidly connected with shaft 301 and the driven section 304. The driving section 303 is connected by a disengagable friction clutch 306 with the inner shaft 309 of a pair of shafts 309 and 310 mounted in nested relationship. The driven section 304 of the hydrodynamic clutch is connected by a friction clutch 354 with the other shaft 310 of the pair of nested shafts. There is a secondary transmisison shaft 316 spaced from the pair of shafts 309, 310 and extending parallel thereto and suitably journalled in transverse walls of the transmission casing. The shaft 316 is permanently geared to the hollow shaft 310 by a pair of meshing gears 314, 315. Moreover, shaft 316 is permanently geared to the inner shaft 309 by a pair of meshing gears 355, 356. Also, the secondary transmission shaft 316 carries a freely rotatable gear 318 engaging a gear 322 fixed to the driven shaft 324 and is adapted by a multidisk friction clutch 230 to be clutched to gear 318. Another multidisk friction clutch 357 is adapted to rigidly connect the two shafts 309 and 324 which are mounted in aligned relationship. If desired, gear 318 may be fixed to shaft 316 and gear 322 may be freely rotatable on but adapted by a friction clutch to be clutched to shaft 324.

For setting the transmission to first gear the clutches 320 and 354 are engaged, whereas the clutches 306 and 357 are disengaged. Power is transmitted from the driving shaft 301 to the driven shaft 324 through the elements 303, 304, 354, 310, 314, 315, 316, 320, 318, 322. For shifting the transmission to second, the clutch 320 is disengaged and the clutch 357 is engaged. Power is transmitted through the following elements: 301, 303, 304, 354, 310, 314, 315, 316, 356, 355, 357, 324. For shifting the transmission to third gear, friction clutches 306 and 320 are engaged, while friction clutches 354 and 357 are disengaged. Motion is transmitted via the elements 301, 303, 306, 309, 355, 356, 316, 320, 318, 322, 324. For shifting the transmission to fourth gear, the friction clutches 306 and 357 are engaged, while the friction clutches 354 and 320 are disengaged. Power is transmitted via the elements 301, 303, 306, 309, 357, 324. Additional gears not shown may be provided to afford a reverse transmission which may or may not include the hydrodynamic clutch.

From the foregoing description of the transmission shown in Fig. 1 it will appear that the first motion-transmitting train of elements co-operatively connecting the driving shaft 301 with the driven shaft 324 includes the hydrodynamic clutch 302 and a first friction clutch 354 which, when disengaged, will disable this motion-transmitting train. Moreover, it will appear that a second motion-transmitting train connecting the shafts 301 and 324 is established including the second friction clutch 306 (and excluding the hydrodynamic clutch) which, when disengaged, will disable the second motion-transmitting train. The two sets of gears 355, 356 and 318, 322 may be optionally included in either train. Thus, the set of gears 355, 356 will be operative in both the second gear and the third gear condition, the first of which only employs the hydrodynamic clutch, while the set of gears 318, 322 will become operative in the first gear condition and in the third gear condition, the first of which only employs the hydrodynamic clutch. Owing to the exclusion of the hydrodynamic clutch from the second motion-transmitting train, a higher efficiency of the transmission will be secured for the higher speeds.

Figure 2:
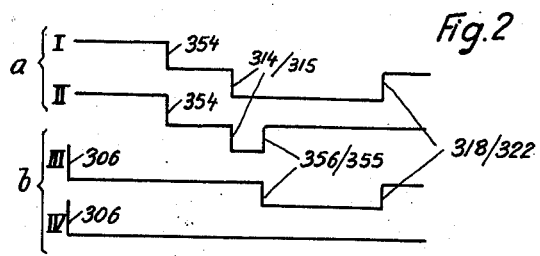
Fig. 2 is a diagram indicating the flow of power through the transmission at different speed adjustments.
Figure 3:
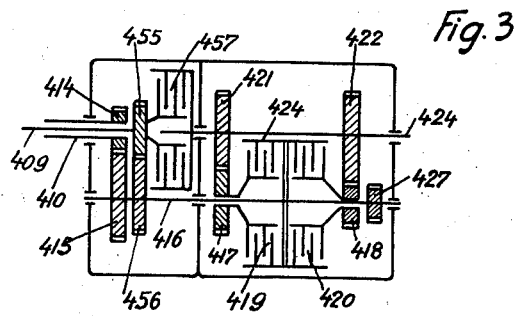
Fig. 3 illustrates a transmission similar to that of Fig. 1 for six forward speeds.
Figure 4:
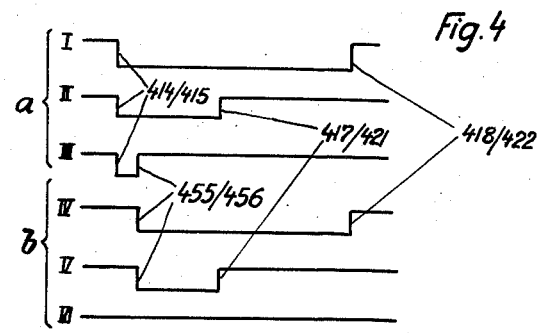
Fig. 4 is a diagram showing the flow of power through the transmission with different speed adjustments thereof.

Another embodiment of my invention is partly illustrated in Figs. 3 and 4 showing a transmission differing from that of Fig. 2 by the provision of an additional set of gears. The two nested shafts 409 and 410 shown in Fig. 3 are similar to shafts 309 and 310 in Fig. 1 and are driven in the same manner as shown in Fig. 1 by means of a hydrodynamic clutch 302 and two friction clutches 306 and 354 from a driving shaft 301. An illustration of such elements has been deemed dispensable in Fig. 3, but it is to be clearly understood that such elements are, in fact, combined with those shown in Fig. 3.

When the transmission is set to the three lower gear conditions I to III indicated in Fig. 4 at $a$, the motion-transmitting train of elements including the hydrodynamic clutch is used, while the friction clutch 306 excluding the hydrodynamic clutch is engaged when the transmission is shifted to fourth, fifth, or sixth gear, as indicated in Fig. 4 at $b$. Fig. 4 shows how the power is transmitted. In the first gear condition clutch 420 only is engaged and in the second gear condition clutch 419 only is engaged. In the third gear condition clutch 457 only is engaged, and in each of these three cases power is transmitted from the hollow shaft 410 through a pair of meshing gears 414, 415 to the secondary transmission shaft 416 and thence either through the pair of gears 418, 422, or the pair of gears 417, 421, or through the pair of gears 455, 456, and the clutch 457 to the driven shaft 424.

In the three upper gear conditions shown in Fig. 4 at b, power is transmitted through the inner shaft 409 and clutch 306 from the driving shaft 301, the fourth gear providing for transfer of motion through clutch 420, the fifth gear through clutch 419, and the sixth gear through clutch 457. At 427 an additional gear is shown forming part of a set of reverse gears not shown in detail.

The shifting operation may be facilitated by the simultaneous disengagement of clutches 306 and 354. That applies particularly to the operation for shifting the transmission into reverse. If desired, the clutches 320, 357, 420, 419, 457 may be constituted by toothed clutches which may be provided with synchronizing means.

In Figs. 5 and 6 I have illustrated embodiments of the present invention in which two gearings arranged in tandem are provided, one marked A including a secondary transmission shaft 516 and the other one marked B being an epicyclic gearing. The transmission shown in Fig. 5 comprises a hydrodynamic clutch designated by 502 as a whole and composed of a driving section 503 rigidly connected with the driving shaft 501 of the transmission and a driven section 504 rigidly connected with one of a pair of shafts 509 and 510 mounted in nested relationship, preferably with the outer one 510 of the pair of shafts. The driving section 503 of the hydrodynamic clutch is connected by a friction clutch 506, preferably comprising one pair of disks, with the internal shaft 509. If desired, a disengagable clutch may be interposed between the driven section 504 of the hydrodynamic clutch and the associated hollow shaft 510. The latter is permanently geared to a secondary transmission shaft 516 by a pair of meshing gears 514 and 515. A shaft 523 is mounted in the transmission casing in coaxial relationship to the shaft 509 and rigidly connected with the latter. The shaft 523 carries two gears 521 and 522 keyed thereto. Gears 517 and 518 which mesh with the gears 521 and 522, respectively, are freely rotatably mounted on and adapted to be clutched to transmission shaft 516 by means of friction clutches 519 and 520, respectively, preferably of the multi-disk type.

The planetary gearing B comprises three co-axial relatively rotatable elements, to wit, a sun gear 558 freely rotatably mounted on shaft 523, a carrier 560 of planetary gears 559 rigidly connected with the driven shaft 524, and an outer internal gear 561. The driven shaft 524 is coaxially aligned with the shaft 523. The sun gear 558 is adapted to be either connected with the shaft 523 by a suitable clutch, such as a friction clutch 562 of the multi-disk type, or to be arrested by a brake 563 mounted on the transmission casing. A second brake 564 is mounted on the transmission casing for the purpose of arresting the outer internal gear 561.

There is a second sun gear 565 fixed to the shaft 523 in permanent mesh with planetary gears 566 mounted on the carrier 560. The gears 566 are so long as to mesh at the same time with the planetary gears 559. If desired, a clutch, such as a friction clutch, may be provided for the purpose of connecting or disconnecting the gear 565 to and from shaft 523.

This transmission has six forward speeds, the four lower ones being transferred via a hydrodynamic clutch, while the two upper speeds are transferred via the friction clutch 506 by-passing the hydrodynamic clutch.

The transmission operates as follows:

First gear: The clutch 506 is disengaged; clutch 520 is engaged; clutch 519 is disengaged; clutch 562 is disengaged; brake 563 is engaged; brake 564 is disengaged. Power is transmitted via the elements 501, 503, 504, 510, 514, 515, 516, 520, 518, 522, 523, 565, 566, 559, 560, 524; in this operation the epicyclic gearing B reduces the speed.

Second gear: The clutch 519 remains disengaged and the clutch 520 is engaged; clutch 562 is engaged; brake 563 is diengaged. Owing to the engagement of clutch 562, the relatively rotatable elements of the epicyclic gearing are locked to one another and revolve in unison. The part A of the transmission acts in the same manner as in first gear.

Third gear: In part A of the transmission clutch 520 is disengaged and clutch 519 is engaged. Hence, motion is transmitted through the pair of gears 517, 521 in lieu of the pair of gears 518, 522. In the epicyclic gearing B the operation is the same as in first gear, clutch 562 being disengaged and brake 563 being engaged.

Fourth gear: The brake 563 is released; the clutch 562 is engaged. The operation in part A of the transmission is the same as in third gear, while the epicyclic gearing B is operated as in second gear, the elements thereof revolving in unison to provide for a direct connection of shafts 523 and 524.

Fifth gear: The clutch 519 is disengaged; clutch 520 remains likewise disengaged; friction clutch 506 is engaged. The epicyclic gearing B remains set in the same manner as in the first gear condition and in the third gear condition acting to reduce the speed. The hydrodynamic clutch is by-passed by friction clutch 506, the power being transmitted via 501, 503, 506, 509, 523, 565, 566, 560, 524.

Sixth gear: The part A of the transmission remains set as before, while the epicyclic gearing B is set in the same manner as for second gear or fourth gear, thus being locked as to revolve in unison. Power is transmitted directly from shaft 501 via the elements 506, 509 and 523 to driven shaft 524.

For the purpose of shifting the transmission to reverse, the clutch 562 and the brake 563 are disengaged, while the brake 564 is engaged. In this event, the power is transmitted either through the hydrodynamic clutch 502 or through the friction clutch 506 to shaft 523 and thence via gear 565, planetary gears 566, 559 and planetary gear carrier 560 to the driven shaft 524.

If desired, gear 565 may be loosely mounted on shaft 523 and a clutch may be provided for connecting the same. As a result, the transmission permits of an additional forward speed by disconnecting gear 565, engaging clutch 562, releasing brake 563, and engaging brake 564.

The embodiment shown in Fig. 7 differs from that shown in Fig. 5 by the provision of two epicyclic gearings C and D arranged in tandem.

The driving shaft 601, which may be the crankshaft of an engine, has an axial bore at its end accommodating the end of a shaft 610 journaled therein on an antifriction bearing. Moreover, shaft 601 is provided with a flange bolted to the plane end wall of a substantially cylindrical housing that is firmly attached in a manner not shown to the driving section 603 of a hydrodynamic clutch which co-operates with a driven section 602 of said clutch, the latter being encased in the cylindrical housing and adapted to be connected with shaft 610 for common rotation by a disengagable friction clutch 654. Thus, it will appear that this embodiment differs from those described supra by the location of the driven section of the hydrodynamic clutch adjacent to the engine and of the driving section remote from the engine.

Shaft 610 is surrounded by a hollow shaft 609 which is journalled in a transverse wall of the transmission casing by means of an antifriction bearing and is adapted to be connected with the driving section 603 by means of a disengagable friction clutch 606. It will be noted that anti-friction rollers are interposed between the two shafts 609 and 610.

The shaft 610 is firmly connected or integral with a sun gear 668 of the epicyclic gearing C, whereas the outer internal gear 670 thereof is firmly connected with the hollow shaft 609. Both gears mesh with planetary gears 669 mounted on studs fixed to a carrier 671 formed by a flange of a shaft 672 mounted in co-axial relationship to shaft 610 and preferably extending into an axial bore of the latter and journalled in such bore by suitable anti-friction rollers. The three elements 668, 670 and 671 of the epicyclic gearing are thus mounted in co-axial relationship for relative rotary motion.

The second epicyclic gearing D is formed by three similar relatively rotatable elements, to wit by a sun gear 675, by an outer internal gear 673 and by a planetary gear carrier 676 carrying a plurality of planetary gears 674 which mesh with the gears 673 and 675.

The internal gear 673 is rigidly connected with the planetary gear carrier 671, whereas the carrier of the planetary gears 674 is formed with a hollow shaft 676 which surrounds the shaft 672 and extends through the right hand end wall of the transmission casing, being journalled therein by a suitable anti-friction bearing. On the outside of the latter the hollow shaft 676 carries a bevel gear 677 fixed thereto which is in mesh with a bevel 678 attached to a driven shaft 679 journalled in a suitable bracket fixed to the transmission casing. If desired, the driven shaft 679 may be mounted to extend parallel to the axis of the transmission and may be geared to shaft 676 by spur gears.

Brakes 680 and 681 are attached to the transmission casing, the former being adapted to arrest the internal gear 670 of the epicyclic gearing C and the latter being adapted to arrest the sun gear 675 acting on a suitable drum which is connected with the sun gear 675 by a bushing journalled on shaft 676. The shaft 672 extends the whole length of shaft 676 through the right hand end wall of the transmission casing and past the bevel gears and at its end carries a suitable drum fixed thereto which co-operates with a brake indicated at 682, the latter being suitably fixed to a bracket bolted to the transmission casing. Thus brake 682 when engaged will arrest shaft 672 and the carrier 671 of gearing C and the internal gear 673 of gearing D. A clutch 684, preferably a friction clutch of the multi-disk type, is mounted on a bell integral with the end of hollow shaft 676 and serves the purpose of optionally clutching the latter to the drum fixed to shaft 672. In this manner, the two shafts 672 and 676 may be connected for rotation in unison. Similarly, a clutch 683, which may be a friction clutch of the multi-disk type, is interposed between an annular member fixed to the internal gear 670 and the drum rigid with the sun gear 675 and adapted to connect the elements 670 and 675 for common rotation.

The operation of the transmission illustrated in Fig. 7 is the following:

For setting the transmission to first gear condition clutch 654 and brakes 680 and 681 are engaged, whereas the other clutches and brakes are disengaged. Hence, the elements 670 and 675 will be arrested. Motion is transmitted via the following elements: 601, 603, 604, 654, 610, 668, 669, 671, 673, 674, 676, 677, 678, 679. Both epicyclic gearings act as reduction gearings.

For setting the transmission to second gear condition clutches 654 and 684 and the brake 680 are engaged, whereas the other clutches and brakes are disengaged. Thus, the internal gear 670 is arrested, while the clutch 684 locks the elements of the epicyclic gearing D to one another for rotation in unison. Motion is transmitted via the hydrodynamic clutch and the elements 654, 610, 668, 669, 671, 672, 684, 676, 677, and 678 to the driven shaft 679.

For setting the transmission to the third gear condition the clutches 606 and 683 and the brake 682 are engaged, while the other clutches and brakes are disengaged. Hence, the internal gear 673 and the planetary gear carrier 671 are arrested by the shaft 672, the drum attached thereto and the brake 682, while the epicyclic gearing C is permitted to run idly. Motion is transmitted via the elements 601, 603, 606, 609, 670, 683, 675, 674, 676, 677, 678, 679.

In order to set the transmission for fourth gear the clutches 606 and 654 and the brake 681 are engaged, while the other clutches and brakes are disengaged. In this manner, the hydrodynamic clutch will co-operatively connect two of the three elements of gearing C for rotation substantially in unison, both elements being capable of but such relative rotation as will be permitted by the slip in the hydrodynamic clutch. From the planetary gear carrier 671 motion will be further transmitted through the elements 673, 674, 676, 677, 678 to the driven shaft 679.

For shifting the transmission to fifth gear the three clutches 606, 654 and 683 are engaged, while the fourth clutch and all of the brakes are disengaged. Here again the epicyclic gearing C is substantially blocked by the connection of two of its elements through the hydrodynamic clutch. The epicyclic gearing D is likewise blocked by engagement of clutch 683. Therefore, all of the rotary elements of the transmission revolve substantially in unison causing the motion to be transferred from the driving shaft 601 to the bevel gear 677 substantially at the ratio of 1:1.

For shifting the transmission into reverse the clutches 654 and 683 and the brake 682 are engaged and the other clutches and brakes are disengaged. Hence, the internal gear 670 of the epicyclic gearing C is connected with the sun gear 675 of the epicyclic gearing D, whereas the planetary gear carrier 671 of gearing C and the internal gear 673 of gearing D are arrested. Motion is transmitted via the elements 601, 603, 602, 654, 610, 668, 669, 670, 683, 675, 674, 676, 677, 678, and 679. In this motion-transmitting train the planetary gears 669 will reverse the rotation.

From the foregoing description it will appear that I have provided a transmission of simple design which is capable of being set up for a plurality of different ratios of transmission by the simple engagement or disengagement of friction means, such as clutches and brakes.

While I have described a number of preferred embodiments of the invention, I wish it to be clearly understood that the same is in no way limited to the details of such embodiments, but is capable of numerous modifications within the scope of the appended claims.

What I claim is:

1. In a transmission of the character described, the combination comprising a driving shaft, a driven shaft, and a transmission shaft; a first motion-transmitting train of elements operative in at least two adjacent lower speeds and operatively connecting said driving shaft with said transmission shaft and including a hydrodynamic clutch, one shaft of a pair of shafts mounted in nested relationship, a first pair of meshing gears operatively connecting said one shaft with said transmission shaft, and a first disengageable friction clutch; a second motion-transmitting train operative in at least two adjacent higher speeds and operatively connecting said driving shaft with said transmission shaft and including the other one of said pair of shafts, a second pair of meshing gears operatively connecting said other shaft with said transmission shaft, and a second disengageable friction clutch; and means including at least two sets of meshing gears for gearing said driven shaft to said transmission shaft to provide at least two transmission ratios, the speed reduction of said first pair of meshing gears being greater than the speed reduction of said second pair of meshing gears.

2. The combination as set forth in claim 1, further comprising another clutch for selectively connecting said driven shaft to said other one of said pair of shafts.

3. The combination as set forth in claim 1, wherein said transmission shaft is spaced from said pair of shafts.

4. In a transmission of the character described with at least four speeds, the combination comprising a driving shaft, an intermediate shaft, a driven shaft, a first motion-transmitting train of elements operative in at least two adjacent lower speeds and operatively connecting said driving shaft with said intermediate shaft including a hydrodynamic clutch, a first set of meshing gears, and a first friction clutch operative upon disengagement thereof to disable said first motion-transmitting train; a second motion-transmitting train operative in at least two adjacent higher speeds and operatively connecting said driving shaft with said intermediate shaft exclusive of said hydrodynamic clutch, but including a second set of meshing gears and a second friction clutch operative upon disengagement thereof to disable said second motion-transmitting train; and gearing means operatively connecting said intermediate shaft with said driven shaft independently of said first and second motion-transmitting trains to thereby provide at least two forward gearing ratios between said intermediate shaft and said driven shaft, said first set of meshing gears having a relatively greater speed reduction than said second set of meshing gears.

5. In a transmission of the character described with at least four forward speeds, the combination comprising a driving shaft, a driven shaft, an intermediate shaft, means constituting a first motion-transmitting train of elements operatively connecting said driving shaft with said intermediate shaft including a hydrodynamic clutch, first meshing gear means and first disengageable means for selectively disabling said first motion-transmitting train upon disengagement thereof; means constituting a second motion-transmitting train operatively connecting said driving shaft with said intermediate shaft exclusive of said hydrodynamic clutch but including second meshing gear means and second disengageable means for selectively disabling said second motion-transmitting train upon disengagement thereof; said first meshing gear means providing a greater speed reduction than said second meshing gear means, and further gear means operatively connecting said intermediate shaft with said driven shaft, the gear ratios of said first meshing gear means, of said second meshing gear means and of said further gear means being so selected that two consecutive lower transmission ratios are obtained with said first gear means upon engagement of said first disengageable means and two consecutive higher transmission ratios are obtained with said second gear means upon engagement of said second disengageable means.

6. In a transmission of the character described, the combination according to claim 5, further comprising reverse gear means operatively connected between said intermediate shaft and said driven shaft, and means for selectively engaging said reverse speed.

7. In a transmission of the character described, the combination according to claim 5, wherein said further gear means includes selectively engageable means for selectively connecting said further gear means between said intermediate shaft and said driven shaft, and further selectively engageable means for connecting said driven shaft with said second meshing gear means.

8. In a transmission of the character described, the combination according to claim 5, wherein said further gear means includes selectively engageable means for selectively connecting one or the other of two sets of meshing gears between said intermediate shaft and said driven shaft.

9. In a transmission of the character described, the combination according to claim 8, further comprising selectively engageable means for directly connecting said driving shaft with said driven shaft.

10. In a transmission of the character described with at least four forward speeds, the combination comprising a driving shaft, a driven shaft, an intermediate shaft, means constituting a first motion-transmitting train of elements operatively connecting said driving shaft with said intermediate shaft including a hydrodynamic clutch, first meshing gear means and first disengageable means for selectively disabling said first motion-transmitting train upon disengagement thereof; means constituting a second motion-transmitting train operatively connecting said driving shaft with said intermediate shaft exclusive of said hydrodynamic clutch but including second meshing gear means and second disengageable means for selectively disabling said second motion-transmitting train upon disengagement thereof; said first meshing gear means providing a greater speed reduction than said second meshing gear means, third meshing gear means and fourth meshing gear means operatively connecting said intermediate shaft with said driven shaft, and selectively engageable means for selectively connecting said intermediate shaft with said driven shaft over said third meshing gear means and said fourth meshing gear means, the gear ratios of said first, second, third and fourth meshing gear means being so selected that two consecutive lower speeds are obtained with said first gear means and with a respective one of said third and fourth meshing gear means upon engagement of said first disengageable means and that two consecutive higher speeds are obtained with said second meshing gear means and with a respective one of said third and fourth meshing gear means upon engagement of said second disengageable means.

11. In a transmission of the character described with at least five forward speeds, the combination comprising a driving shaft, a driven shaft, an intermediate shaft, means constituting a first motion-transmitting train of elements operatively connecting said driving shaft with said intermediate shaft including a hydrodynamic clutch, first meshing gear means and first disengageable means for selectively disabling said first motion-transmitting train upon disengagement thereof; means constituting a second motion-transmitting train operatively connecting said driving shaft with said intermediate shaft exclusive of said hydrodynamic clutch but including second meshing gear means and second disengageable means for selectively disabling said second motion-transmitting train upon disengagement thereof; said first meshing gear means providing a greater speed reduction than said second meshing gear means, third and fourth meshing gear means including selectively engageable means for selectively and operatively connecting said intermediate shaft with said driven shaft over either said third or fourth meshing gear means, the gear ratios of said first, second, third and fourth meshing gear means being so selected that two consecutive lower speeds are obtained with said first gear means and with a respective one of said third and fourth meshing gear means upon engagement of said first disengageable means and that two consecutive higher speeds are obtained with said second meshing gear means and with a respective one of said third and fourth meshing gear means upon engagement of said second disengageable means, and further selectively engageable means for providing a one-to-one transmission ratio between said driving shaft and said driven shaft.

12. In a transmission of the character described, the combination according to claim 11, wherein said means constituting said second motion-transmitting train includes an additional shaft intermediate said second disengageable means and said second meshing gear means and wherein said further selectively engageable means selectively and operatively connects said additional shaft with said driven shaft.

13. In a transmission of the character described with at least five forward speeds, the combination comprising a driving shaft, a driven shaft, an intermediate shaft, means constituting a first motion-transmitting train of elements operatively connecting said driving shaft with said intermediate shaft including a hydrodynamic clutch, first meshing gear means and first engageable means for selectively engaging said first motion-transmitting train upon engagement thereof; means constituting a second motion-transmitting train operatively connecting said driving shaft with said intermediate shaft exclusive of said hydrodynamic clutch but including second meshing gear means and second engageable means for selectively engaging said second motion-transmitting train upon engagement thereof; said first meshing gear means providing a greater speed reduction than said second meshing gear means, third meshing gear means including third engageable means for selectively connecting said intermediate shaft with said driven shaft and over said third meshing gear means, fourth meshing gear means including fourth engageable means for selectively connecting said intermediate shaft with said driven shaft over said fourth meshing gear means, and fifth engageable means for selectively and operatively connecting said intermediate shaft to said driven shaft and over said second meshing gear means, the gear ratios of said first, second, third and fourth gear means being so selected that three consecutive lower speeds are obtained upon engagement of said first engageable means and one of said third, fourth and fifth engageable means respectively with said second engageable means disengaged, while two consecutive higher speeds are obtained upon engagement of said second engageable means and of one of said third and fourth engageable means respectively with said first engageable means disengaged.

14. In a transmission of the character described, the combination according to claim 13, wherein engagement of said second and fifth engageable means provides a sixth speed having a one-to-one ratio between said driving and driven shafts.

15. In a transmission of the character described with at least six forward speeds, the combination comprising a driving shaft, a driven shaft, an intermediate shaft, means constituting a first motion-transmitting train of elements operatively connecting said driving shaft with said intermediate shaft including a hydrodynamic clutch, first pair of meshing gears, a first auxiliary shaft connecting said hydrodynamic clutch with said first meshing gear means, and first engageable means for selectively engaging said first motion-transmitting train upon engagement thereof; means constituting a second motion-transmitting train operatively connecting said driving shaft with said intermediate shaft exclusive of said hydrodynamic clutch but including second pair of meshing gears, second engageable means for selectively engaging said second motion-transmitting train upon engagement thereof, and a second auxiliary shaft operatively connecting said second engageable means with said second meshing gear means; said first pair of meshing gears providing a greater speed reduction than said second pair of meshing gears, a third pair of meshing gears including third engageable means for selectively connecting said intermediate shaft with said driven shaft, a fourth pair of meshing gears including fourth engageable means for selectively connecting said intermediate shaft with said driven shaft, and fifth engageable means for selectively connecting said second auxiliary shaft with said driven shaft, the gear ratios of said first, second, third and fourth pair of meshing gears being so selected that three lower speeds are obtained upon engagement of said first engageable means and one of said third, fourth and fifth engageable means respectively with said second engageable means disengaged, while three higher speeds are obtained upon engagement of said second engageable means and one of said third, fourth and fifth engageable means respectively while said first engageable means is disengaged.

References Cited in the file of this patent

UNITED STATES PATENTS

| | | |
|---|---|---|
| 2,344,656 | Swennes | Mar. 21, 1944 |
| 2,351,483 | Carnagua | June 13, 1944 |
| 2,355,709 | Dodge | Aug. 15, 1944 |
| 2,418,378 | Voytech | Apr. 1, 1947 |
| 2,454,014 | Seybold | Nov. 16, 1948 |
| 2,518,824 | Simpson | Aug. 15, 1950 |
| 2,543,412 | Kegresse | Feb. 27, 1951 |
| 2,570,192 | Beckwith | Oct. 9, 1951 |
| 2,632,539 | Black | Mar. 24, 1953 |
| 2,722,844 | Dodge | Nov. 8, 1955 |

FOREIGN PATENTS

| | | |
|---|---|---|
| 896,154 | France | Feb. 14, 1945 |